United States Patent [19]

Takahashi et al.

[11] Patent Number: 5,780,104
[45] Date of Patent: Jul. 14, 1998

[54] METHOD FOR PREVENTING THE INNER WALL SURFACES OF THE POLYMERIZATION APPARATUS FROM BEING FOULED WITH SCALE DURING THE POLYMERIZATIOIN OF VINYL CHLORIDE

[75] Inventors: Akihiko Takahashi, Osaka-fu; Sunao Maeda; Yuzo Ono, both of Aichi-ken; Masaaki Ozawa; Ichisaburo Nakamura, both of Osaka-fu, all of Japan

[73] Assignee: Mitsui Chemicals, Inc., Tokyo, Japan

[21] Appl. No.: 768,970

[22] Filed: Dec. 18, 1996

[30] Foreign Application Priority Data

Dec. 28, 1995 [JP] Japan ................................ 7-342147

[51] Int. Cl.$^6$ ........................................... B05D 7/22
[52] U.S. Cl. ................ 427/230; 427/236; 526/62; 526/201; 526/344; 526/345; 528/86; 528/126; 528/219
[58] Field of Search ................ 427/230, 236; 528/86, 126, 219; 526/62, 201, 344, 345

[56] References Cited

U.S. PATENT DOCUMENTS

| | | | |
|---|---|---|---|
| Re. 35,247 | 5/1996 | Cyrus, Jr. et al. | 435/156 |
| 4,080,173 | 3/1978 | Cohen | 23/285 |
| 4,297,320 | 10/1981 | Cohen | 422/131 |
| 4,579,758 | 4/1986 | Dorsch et al. | 428/35 |
| 4,647,925 | 3/1987 | Osman et al. | 340/825.05 |
| 4,900,671 | 2/1990 | Pokora et al. | 435/156 |
| 5,112,752 | 5/1992 | Johnson et al. | 435/192 |
| 5,147,793 | 9/1992 | Johnson et al. | 435/156 |
| 5,153,298 | 10/1992 | Pokora et al. | 528/86 |
| 5,188,953 | 2/1993 | Johnson et al. | 435/156 |
| 5,278,055 | 1/1994 | Cyrus, Jr. et al. | 435/156 |
| 5,367,043 | 11/1994 | Butler et al. | 528/193 |
| 5,508,180 | 4/1996 | Johnson et al. | 435/128 |
| 5,541,091 | 7/1996 | Wheeler et al. | 435/128 |

FOREIGN PATENT DOCUMENTS

| | | |
|---|---|---|
| 0462284 | 12/1991 | European Pat. Off. . |
| 54-85291 | 7/1979 | Japan . |
| 54-162782 | 12/1979 | Japan . |
| 55-13708 | 1/1980 | Japan . |
| 55-23135 | 2/1980 | Japan . |
| 55-38844 | 3/1980 | Japan . |
| 55-500823 | 10/1980 | Japan . |
| WO91/09879 | 7/1991 | WIPO . |

OTHER PUBLICATIONS

Atlow et al, "Dephenolization of Industrial Wastewaters Catalyzed by Polyphenol Oxidase", *Biotechnology and Bioengineering*, vol. XXVI, pp. 599–603 (1984).
Polymer Synthesis, pp. 213–215 (1986).

Primary Examiner—Judy M. Reddick
Attorney, Agent, or Firm—Burns, Doane, Swecker & Mathis, L.L.P.

[57] ABSTRACT

A method for the homopolymerization or copolymerization of vinyl chloride, wherein the inner wall of the polymerizer and the like are prevented from being fouled with the resulting polymer by applying a coating fluid containing the oxidative polymerization product of a specific phenolic monomer to the surface of the inner wall of the polymerizer and the like, as well as an anti-fouling agent used for this purpose. The method of this invention can very effectively prevent the polymerizer and the like from being fouled with the resulting polymer without affecting the polymerization rate and various properties of the product. Consequently, the necessity of performing the operation for removal of the deposited polymer after completion of each polymerization cycle is eliminated, thus making it possible to achieve closed polymerization requiring no manhole opening after each polymerization cycle which is becoming increasingly popular in recent years.

6 Claims, No Drawings

METHOD FOR PREVENTING THE INNER WALL SURFACES OF THE POLYMERIZATION APPARATUS FROM BEING FOULED WITH SCALE DURING THE POLYMERIZATIOIN OF VINYL CHLORIDE

BACKGROUND OF THE INVENTION a) Field of the Invention

This invention relates to an improved method for the homopolymerization or copolymerization of vinyl chloride. More particularly, it relates to a method for preventing the inner wall surface of the polymerization apparatus (i.e., the polymerizer and the like) from being fouled with the resulting polymer and to an anti-fouling agent used for this purpose.

b) Description of the Related Art

In the homopolymerization of vinyl chloride, the copolymerization of vinyl chloride and monomers copolymerizable therewith, and the graft polymerization (hereinafter referred to briefly as "polymerization") of vinyl chloride, the resulting polymer is deposited on those parts of the polymerization apparatus which come into contact with the monomer or monomers during polymerization operation, including the inner wall of the polymerizer, the reflux condenser, the agitating blades, the baffle plate, various attached pipe joints and the like. This poses problems, for example, in that the cooling capacity of the polymerizer is reduced and the polymer once deposited may separate and mix in the homopolymer or copolymer of vinyl chloride (hereinafter referred to as the "product") to deteriorate the quality of the product.

Consequently, after completion of each polymerization cycle, the polymerizer is usually cleaned before starting the next polymerization cycle. This operation requires a substanstial amount of labor and time, resulting in a reduction in the working efficiency of the polymerizer and an increase in the cost of the product.

In order to avoid this difficulty, methods for preventing the inner wall of the polymerizer and other parts from being fouled with polymer by applying a suitable agent thereto have conventionally been proposed.

However, though producing an anti-fouling effect, these methods have several shortcomings, for example, in that they reduce the polymerization rate and deteriorate various properties of the product. Thus, none of them are satisfactory for use in industrial applications. On the other hand, methods exerting no adverse influence on the polymerization rate and various properties of the product have also been proposed, but these methods fail to achieve a satisfactory anti-fouling effect and an adequate duration of the effect.

For example, there have been proposed a method which comprises applying the self-condensate of a dihydric or trihydric phenol (Japanese Patent Laid-Open No. 7487/'79, corresponding to U.S. Pat. No. 4,080,173), a method which comprises applying the reaction product of the self-condensate of a polyhydric phenol with a bleaching agent (Published Japanese Translation of PCT International Publication No. 500823/'80), a method which comprises applying the reaction product of thiodiphenol with a bleaching agent (Published Japanese Translation of PCT International Publication No. 500417/'81, corresponding to U.S. Pat. No. 4,297,320), and a method which comprises applying the co-condensation product of resorcinol and an aldehyde (Published Japanese Translation of PCT International Publication Nos. 502169/'82 and 502170/'82; U.S. Pat. No. 4,579,758). However, the anti-fouling effects of these methods are still unsatisfactory.

As used herein, the term "vinyl chloride monomer" means vinyl chloride monomer alone or a mixture of vinyl chloride and at least one monomer copolymerizable or graft-copolymerizable with vinyl chloride.

The problem addressed by the present inventors has been to develop a method which, in the polymerization of a vinyl chloride monomer, can very effectively prevent the polymerizer and the like from being fouled with the resulting polymer without affecting the polymerization rate and various properties of the product and which eliminates the necessity of performing the operation for removal of the deposited polymer after completion of each polymerization cycle and makes it possible to achieve closed polymerization requiring no manhole opening after each polymerization cycle.

SUMMARY OF THE INVENTION

In order to solve the above-described problem, the present inventors have made intensive investigations and have now completed the present invention.

Thus, the present invention provides, for use in the homopolymerization of vinyl chloride monomer or the copolymerization of vinyl chloride monomer and a monomer copolymerizable therewith, a method for preventing the inner walls of the polymerization apparatus with scale during polymerization by previously applying a coating fluid to the inner walls coming into contact with the monomer or monomers, characterized in that a coating fluid containing the rection product obtained by the oxidative polymerization of a phenolic monomer of the formula

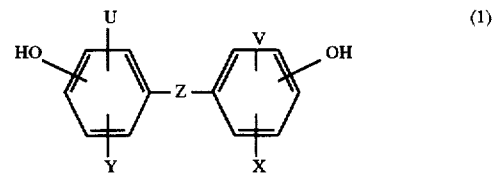

(1)

where U, V, X and Y are each a hydrogen atom, an alkyl group, an alkoxy group, an aryl group or a phenylalkyl group, Z is —CO—, —(R$^1$)C(R$^2$)—, —O—, —OR$^3$—, —R$^4$O—, —R$^5$— or —C(R$^6$)—, R$^1$ and R$^2$ are each a hydrogen atom or a linear or branched alkyl group of 1 to 5 carbon atoms, R$^3$ and R$^4$ are each a linear or branched alkylene group of 1 to 5 carbon atoms, R$^5$ is a linear or branched alkylene group of 1 to 8 carbon atoms, and R$^6$ is a saturated aliphatic ring group of 3 to 6 carbon atoms, is applied to the surfaces of the inner walls to form a coating layer thereon.

This application is based on application Nos. 342147/95 and 332211/96 filed in Japan, the content of which is incorporated hereinto by reference.

DESCRIPTION OF THE PREFERRED EMBODIMENTS

The present invention also provides the above-described method for the polymerization of vinyl chloride monomer wherein the oxidative polymerization is enzymatic oxidative polymerization.

Moreover, the present invention also provides an anti-fouling agent containing, as active ingredient, the reaction product obtained by the oxidative polymerization of a phenolic monomer of the formula

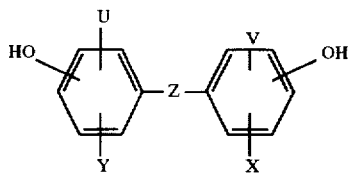

(1)

where U, V, X and Y are each a hydrogen atom, an alkyl group, an alkoxy group, an aryl group or a phenylalkyl group, Z is —CO—, —($R^1$)C($R^2$)—, —O—, —$OR^3$—, —$R^4$O—, —$R^5$— or —C($R^6$)—, $R^1$ and $R^2$ are each a hydrogen atom or a linear or branched alkyl group of 1 to 5 carbon atoms, $R^3$ and $R^4$ are each a linear or branched alkylene group of 1 to 5 carbon atoms, $R^5$ is a linear or branched alkylene group of 1 to 8 carbon atoms, and $R^6$ is a saturated aliphatic ring group of 3 to 6 carbon atoms.

Furthermore, the present invention also provides the above-described method wherein the coating fluid is an alkali metal hydroxide or alkaline earth metal hydroxide solution containing the reaction product, the concentration of the reaction product in the alkali metal hydroxide or alkaline earth metal hydroxide solution is in the range of 0.1 to 10.0% by weight, and the concentration of the alkali metal hydroxide or alkaline earth metal hydroxide is in the range of 0.05 to 5.0% by weight.

Furthermore, the present invention also provides the above-described method wherein the coating fluid is an organic solvent solution containing the reaction product.

Furthermore, the present invention also provides the above-described method wherein the concentration of the reaction product in the organic solvent solution is in the range of 0.03 to 3.0% by weight.

The method for the polymerization of vinyl chloride monomer in accordance with the present invention is characterized in that, in order to prevent the aforesaid surface from being fouled with the resulting vinyl chloride polymer by previously applying a coating fluid thereto, a coating fluid containing the reaction product obtained by the oxidative polymerization of a phenolic monomer of the formula

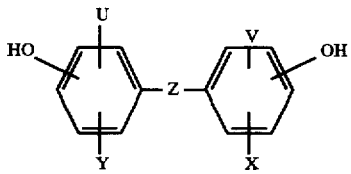

(1)

where U, V, X and Y are each a hydrogen atom, an alkyl group, an alkoxy group, an aryl group or a phenylalkyl group, Z is —CO—, —($R^1$)C($R^2$)—, —O—, —$OR^3$—, —$R^4$O—, —$R^5$— or —C($R^6$)—, $R^1$ and $R^2$ are each a hydrogen atom or a linear or branched alkyl group of 1 to 5 carbon atoms, $R^3$ and $R^4$ are each a linear or branched alkylene group of 1 to 5 carbon atoms, $R^5$ is a linear or branched alkylene group of 1 to 8 carbon atoms, and $R^6$ is a saturated aliphatic ring group of 3 to 6 carbon atoms, is applied to the aforesaid surface to form a coating layer thereon.

The coating agent used in the method of the present invention is obtained by the oxidative polymerization of a phenol. No particular limitation is placed on the method for this oxidative polymerization, so long as the phenol can be polymerized by the dehydration reaction of oxygen with the hydrogen present in the phenol.

A preferred method for the preparation of the reaction product used in the present invention is an enzymatic oxidative polymerization process as described in BIOTECHNOLOGY AND BIOENGINEERING, Vol. 26, 599–603 (1984) and Published Japanese Translation of PCT International Publication No. 502079/'88. In this process, a phenolic monomer is polymerized in a water-organic solvent system or an organic system by adding a peroxide thereto in the presence of a peroxidase enzyme catalyst. Although the above-described enzymatic oxidative polymerization process is preferred in order to obtain the reaction product of the present invention, there can also be employed an oxidative coupling polymerization process using a copper catalyst as described by Furukawa ["Polymer Synthesis" (February, 1987, Kagaku Dojin Co., Ltd.), pp. 213–215].

The enzymatic oxidative polymerization process is more specifically described below.

The enzymatic oxidative polymerization reaction of the present invention is carried out in a water-organic solvent system or an organic solvent. Although water-miscible organic solvents are preferred for this purpose, water-immiscible organic solvents may also be used. Specific examples of the water-miscible organic solvents include, but are not limited to, methanol, ethanol, dioxane, tetrahydrofuran (THF), N,N-dimethylformamide (DMF), dimethyl sulfoxide (DMSO), acetonitrile and acetone. Specific examples of the water-immiscible organic solvents include, but are not limited to, hexane, chloroform, methyl ethyl ketone, ethyl acetate, butanol and toluene.

The water may comprise distilled water or a buffer solution. When a buffer solution is used, a phosphate buffer solution, acetate buffer solution or succinate buffer solution having a pH in the range of 4 to 12 is preferred, but the present invention is not limited thereto.

The mixing ratio (volume ratio) of water to the organic solvent may preferably range from 1:9 to 9:1, but the present invention is not limited thereto.

The enzyme catalyst used for this reaction is a peroxidase enzyme. The most suitable peroxidase enzymes are horseradish peroxidase and soybean peroxidase, but chloroperoxidase, lactoperoxidase and the like may also be used.

The enzyme catalyst is used in an amount of 10 mg to 10 g per 100 g of the phenolic monomer.

In the aforesaid reaction, it is recommendable to use a peroxide as an oxidizing agent. Hydrogen peroxide that is inexpensive and easily handleable is commonly used for this purpose, but the present invention is not limited thereto. The peroxide (e.g., hydrogen peroxide) is used in an amount of 0.1 to 2.0 moles per mole of the phenolic monomer.

The reaction procedure may comprise providing an organic solvent or a mixture of an organic solvent and water, dissolving the phenolic monomer and the peroxidase enzyme therein, and stirring the resulting solution. Alternatively, it may comprise dissolving the phenolic monomer in an organic solvent, dissolving the peroxidase enzyme in water, mixing these two solutions, and stirring the resulting mixture. The reaction is carried out at a temperature in the range of 10° to 40° C. and preferably at room temperature (20° C.). An additional amount of the phenolic monomer used as the starting material may be added during the reaction.

After completion of the reaction, the reaction product is obtained by filtering the reaction mixture. Where the reaction product is dissolved in the reaction solvent on the basis of its polarity, the reaction product may be precipitated by removing the organic solvent under reduced pressure or by adding a poor solvent for the reaction product (e.g., water). Then, the reaction product may be recovered by filtration.

The phenolic monomer used for this reaction may consist of a single phenolic monomer or a mixture of two or more phenolic monomers.

No particular limitation is placed on the type of the phenolic monomer used, so long as it is a compound represented by the general formula (1). Specific examples thereof include bisphenol A (4.4'-dihydroxydiphenyl-2.2-propane), bisphenol F (2.2'-dihydroxydiphenylmethane. 2.4'-dihydroxyphenylmethane, 4.4'-dihydroxydiphenylmethane) and 4.4'-dihydroxydiphenyl ketone.

In the method of the present invention, a part (less than 50 mole %) of the phenolic monomer of the general formula (1) may be replaced by another phenolic monomer of the formula

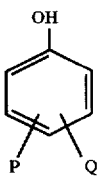
(2)

where each of P and Q is preferably a hydrogen atom, an alkyl group of 1 to 10 carbon atoms, an alkoxy group having a hydrocarbon residue of 1 to 10 carbon atoms, an aryl group of 6 to 20 carbon atoms, a phenylalkyl group of 6 to 20 carbon atoms, a hydroxyl group or —COOR (in which R is a hydrogen atom or an alkyl group of 1 to 10 carbon atoms).

No particular limitation is placed on the type of the phenolic monomer used for this purpose, so long as it is a compound represented by the formula (2). Specific examples thereof include phenol; alkylphenols such as o-cresol, m-cresol, p-ethylphenol and 3.4-xylenol; arylphenols such as p-phenylphenol; and polyhydric phenols such as catechol, hydroquinone, resorcinol and pyrogallol.

The molecular weight of the reaction product is in the range of 400 to 35.000, preferably 600 to 10.000, as expressed in terms of weight-average molecular weight. Its molecular weight can be determined by GPC. For example, this can be done by making a measurement at 40° C. with a THF solution having a polymer concentration of 0.2% by weight and containing 1% by weight of acetic acid, and then comparing the measured data with those obtained with standard substances comprising phenolic compounds such as phenol, bisphenol A, Irganox 1076 (trade name; manufactured by Ciba-Geigy Ltd.) and Irganox 1010 (trade name; manufactured by Ciba-Geigy Ltd.).

The theoretical ground on which an anti-fouling effect is produced by applying the aforesaid reaction product to the inner wall of the vinyl chloride polymerizer and the like has not been established yet. However, it is probable that the hydrophilic hydroxyl groups located in the side chains of this reaction product impart oil repellency to the wall surface and thereby keep off vinyl chloride monomer and, moreover, these hydroxyl groups also have a powerful radical-capturing effect and thereby preventing the polymerization of vinyl chloride monomer at the wall surface. Furthermore, the aforesaid reaction product scarcely dissolves into the reaction mixture for the polymerization of vinyl chloride because it is partially formed into a three-dimensional structure, and it is certain that the polymerization rate is not reduced thereby.

Although the structure of the reaction product obtained by enzymatic oxidative polymerization has not been elucidated, it is presumed that, when the phenolic monomer simply comprises phenol, the structure of the reaction product consists largely of a polyphenol structure as represented by the A part of the following formula (3) and also consists partially of a polyphenylene ether structure as represented by the B part thereof (this structural formula presumptively represents the presence of two types of structures (A and B), and m and n in this formula simply designate the average numbers of repeating units constituting the respective structures and are not intended to mean that these repeating units are joined in block form.)

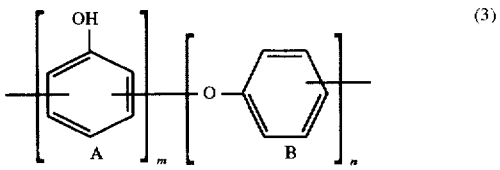
(3)

The hydroxyl equivalent of a resin actually obtained by enzymatic oxidative polymerization was measured. Specifically, the hydroxyl equivalent of the reaction product prepared from phenol in substantially the same manner as described in Preparation Example 1 was found to be 180. On the assumption that the reaction product consists entirely of the A part, its hydroxyl equivalent is calculated to be about 92. On the basis of this fact, it is believed that a resin obtained by enzymatic oxidative polymerization is a compound having a composite structure consisting of the A and B parts, or a mixture of a compound consisting of the A part alone and a compound consisting of the B part alone. In this case, the repeating units are joined to each other at the ortho or para positions to the OH group of the A part and the —O— group of the B part.

When a phenolic monomer of the formula (1) in accordance with the present invention is used in the enzymatic oxidative polymerization which yields a reaction product as described above, the structure of the resulting reaction product has not been elucidated. However, it is believed that both phenol units probably participate in the reaction.

In the present invention, an aqueous alkali metal hydroxide solution, aqueous alkaline earth metal hydroxide solution or organic solvent solution containing the aforesaid reaction product is applied to the inner wall of the polymerizer and the like.

In the case of an aqueous alkali metal hydroxide or alkali earth metal hydroxide solution, the alkali metal hydroxide or alkali earth metal hydroxide used therein can be lithium hydroxide, sodium hydroxide, potassium hydroxide, calcium hydroxide or the like, and preferably sodium hydroxide or potassium hydroxide. In this case, the coating fluid is prepared in the form of an aqueous alkaline solution containing the alkali metal hydroxide or alkali earth metal hydroxide at a concentration of 0.05 to 5.0% by weight, preferably 0.1 to 3.0% by weight, and the reaction product at a concentration of 0.1 to 10.0% by weight, preferably 0.2 to 6.0% by weight. If the concentration of the reaction product is less than 0.1% by weight, a large volume of the coating fluid needs to be applied, resulting in reduced workability. Moreover, a satisfactory anti-fouling effect cannot be produced. On the other hand, if it is greater than 10.0% by weight, it becomes difficult to apply the coating fluid evenly to the wall surface and, moreover, the amount of coating fluid applied becomes uneconomically large. Furthermore, since the coating fluid is applied in large amounts, there is an increased possibility that, unless the coated surface is thoroughly washed with water, the components of the coating layer may dissolve into the reaction system and bring about disadvantages such as a coloration of the product.

Where an aqueous alkali metal hydroxide or alkali earth metal hydroxide solution containing the aforesaid reaction product is used, one or more water-soluble additives may be added thereto in order to enhance the adhesion efficiency of the anti-fouling agent to the wall surface of the polymerizer and the like. As the additives, there may be used various water-soluble compounds including, for example, humic acid and its derivatives as described in Japanese Patent Laid-Open No. 85291/'79; cellulose and cellulose derivatives as described in Japanese Patent Laid-Open No. 162782/'79; alginic acid as described in Japanese Patent Laid-Open No. 13708/'80; hemicelluloses as described in Japanese Patent Laid-Open No. 231235/'80; starch and starch derivatives as described in Japanese Patent Laid-Open No. 38844/'80; and polyvinyl alcohol and polyvinyl pyrrolidone.

Where an organic solvent solution containing the aforesaid reaction product is used, there may be used any organic solvent that dissolves the reaction product and exerts no influence on the polymerization reaction or various properties of the resulting polymer. For example, tetrahydrofuran, dioxane, methanol, ethanol, acetone, chloroform and mixtures thereof can preferably be used. The concentration of the reaction product in the organic solvent solution is preferably in the range of 0.03 to 3.0% by weight and more preferably in the range of 0.06 to 1.5% by weight. If the concentration of the reaction product is less than 0.03% by weight, a large volume of the coating fluid needs to be applied, resulting in reduced workability. Moreover, a satisfactory anti-fouling effect cannot be produced. On the other hand, if it is greater than 3.0% by weight, the amount of coating fluid applied tends to become excessively large in local areas and, in consequence, the coating fluid is uneconomically applied in a larger amount than necessary. Moreover, there is an increased possibility that, unless the coated surface is thoroughly washed with water, the components of the coating layer may dissolve into the reaction system and bring about disadvantages such as a coloration of the product.

No particular limitation is placed on the method for applying the coating fluid of the present invention to the inner wall of the polymerizer and the like, and the coating fluid may be applied thereto according to any of various common methods such as brushing, spraying and rinsing. After the coating fluid is applied, the coated surface is washed with water as required. The amount of coating fluid applied is usually in the range of 0.005 to 10 g/m$^2$, preferably 0.01 to 5 g/m$^2$, as expressed in terms of the weight of the reaction product. If the amount of coating fluid applied is less than 0.005 g/m$^2$, the resulting coating layer is unduly thin and fails to produce a satisfactory anti-fouling effect. If it is greater than 10 g/m$^2$, no additional anti-fouling effect is produced and the coating fluid is uneconomically wasted. Moreover, unless the coated surface is thoroughly washed with water, there is an increased possibility that the quality of the product may be adversely affected. The application of the coating fluid may be performed before starting the polymerization of each batch. Alternatively, once the coating fluid is applied, a plurality of batches may be repeatedly polymerized with simple washing with water between each batch and the next.

Although no particular limitation is placed on the method for applying the coating fluid of the present invention and any well-known coating method may be employed, the most suitable application method is one described in Domestic Republication of PCT International Publication for Patent Application No. JP501884/91 (corresponding to International Publication No. WO91/09879, EP-A-0462284), claims 1-3 and page 9, lines 5-29.

More specifically, this is an application method using a coating fluid adjusted to such a pH that the coating agent is dissolved at the temperature where the coating fluid is applied to the wall surface of the polymerizer and the coating agent precipitates when the coating fluid is heated by the heated wall surface of the polymerizer. When the coating fluid is applied in this manner, the coating agent forms a uniform thin layer adhering strongly to the wall surface, thus producing an excellent anti-fouling effect.

The coating agent present in the aforesaid coating fluid precipitates when its pH is reduced and the temperature is raised. Accordingly, the pH of the coating fluid is adjusted to a pH which is higher than the pH at which the coating agent precipitates at room temperature by preferably 0.2 to 4.0 and more preferably 0.3 to 3.0.

As described above, the coating agent is usually prepared in the form of an aqueous alkali metal hydroxide or alkaline earth metal hydroxide solution. Accordingly, its pH is usually regulated by the addition of an acid. The acids which can be used for pH-regulating purposes include, for example, inorganic acids such as hydrochloric acid, sulfuric acid, phosphoric acid and nitric acid; and organic acids such as ascorbic acid, acetic acid, citric acid and mercaptopropionic acid.

When the coating fluid of the present invention is applied to the inner wall of the polymerizer and the like, it is desirable that the wall surface to be coated should be heated to a temperature preferably in the range of 40° to 100° C. Accordingly, the temperature should more preferably be in the range of 45° to 90° C. and most preferably in the range of 50° to 90° C. After the coating fluid is applied and the coating agent is precipitated, the coated surface is preferably washed with water from the viewpoint of product quality.

The present invention can be applied not only to the homopolymerization of vinyl chloride, but also to the copolymerization of vinyl chloride and at least one other radical-polymerizable monomer or graft copolymerization of vinyl chloride to graft-polymerizable polymer.

The other radical-polymerizable monomers which can be used for this purpose include, for example, vinyl esters such as vinyl acetate, vinyl propionate, vinyl caproate, vinyl laurate and vinyl stearate; olefins such as ethylene, propylene and isobutylene; alkyl vinyl ethers and aryl vinyl ethers such as isobutyl vinyl ether, octyl vinyl ether, dodecyl vinyl ether and phenyl vinyl ether; halogenated olefins such as vinylidene chloride, vinyl fluoride, propylene chloride and vinyl bromide; acrylic esters and methacrylic esters such as ethyl acrylate, n-butyl methacrylate, 2-ethylhexyl acrylate, 2-ethylhexyl methacrylate and stearyl methacrylate; acrylic derivatives such as acrylic acid, methacrylic acid; and other monomers such as crotonic acid, acrylonitrile, maleic anhydride and itaconic anhydride.

The polymers to which vinyl chloride can be graft-polymerized include, for example, ethylene-vinyl acetate copolymer (EVA), ethylene-ethyl acrylate copolymer, chlorinated polyethylene, polyurethanes, polybutadiene, polybutadiene-styrene-methyl methacrylate (MBS), polybutadiene-acrylonitrile-(α-methyl)styrene (ABS), polybutyl acrylate, butyl rubber, polystyrene, styrene-butadiene copolymer and crosslinked acrylic rubber.

Moreover, the present invention can be applied to various types of polymerization of the aforesaid monomer, including aqueous suspension polymerization, aqueous emulsion polymerization, and bulk polymerization using no polymerization medium. In the practice of the present invention, each type of polymerization may be carried out under commonly employed polymerization conditions. Furthermore, the present invention can also be effectively practiced under closed polymerization conditions as described in Japanese Patent Laid-Open No. 233207/'95.

When employed in the polymerization of a vinyl chloride monomer, the method of the present invention can very effectively prevent the polymerizer and the like from being fouled with the resulting polymer without affecting the polymerization rate and various properties of the product. Consequently, the necessity of performing the operation for removal of the deposited polymer after completion of each polymerization cycle is eliminated, thus making it possible to achieve closed polymerization requiring no manhole opening after each polymerization cycle which is becoming increasingly popular in recent years.

The present invention is more specifically explained with reference to the following examples. However, these examples are intended solely to illustrate the invention and are not to be construed to limit the scope of the invention. In these examples, all percentages are by weight unless otherwise specified.

PREPARATION EXAMPLE 1

20 g (0.088 mole) of bisphenol A and 0.20 g of horseradish peroxidase were dissolved in a mixture composed of 240 ml of a phosphate buffer (pH 7.0, phosphate concentration: 0.05M) and 160 ml of methanol. Then, at room temperature (about 20° C.), 10 ml of 31% hydrogen peroxide was added dropwise thereto at a rate of 1 ml per hour, followed by stirring. After 12 hours, the reaction mixture was filtered to obtain 18 g of the desired resin in a 90% yield [molecular weight (Mw): 1140]. Thereafter, a coating fluid (pH 12.9) was prepared by dissolving this resin in a 1.0 wt. % aqueous NaOH solution and adjusting the solid concentration of the resulting solution to 2.0% by weight.

PREPARATION EXAMPLE 2

A coating fluid was prepared by dissolving the resin of Preparation Example 1 in methanol and adjusting the resin concentration of the resulting solution to 0.4% by weight.

PREPARATION EXAMPLE 3

17.6 g (0.088 mole) of bisphenol F and 0.20 g of horseradish peroxidase were dissolved in a mixture composed of 240 ml of a phosphate buffer (pH 7.0, phosphate concentration: 0.05M) and 160 ml of methanol. Then, at room temperature (about 20° C.), 10 ml of 31% hydrogen peroxide was added dropwise thereto at a rate of 1 ml per hour, followed by stirring. After 12 hours, the reaction mixture was filtered to obtain 15.8 g of the desired resin in a 90% yield [molecular weight (Mw): 1480]. Thereafter, a coating fluid (pH 13.0) was prepared by dissolving this resin in a 1.0 wt. % aqueous NaOH solution and adjusting the solid concentration of the resulting solution to 2.0% by weight.

PREPARATION EXAMPLE 4

A coating fluid was prepared by dissolving the resin of preparation Example 3 in methanol and adjusting the resin concentration of the resulting solution to 0.4% by weight.

PREPARATION EXAMPLE 5

A 500-ml autoclave was charged with 170 g (1.54 moles) of resorcinol, and its internal temperature was raised to 300° C. over a period of one hour with stirring. Then, the reaction was continued at that temperature for an additional 8 hours. Thereafter, the temperature was lowered and an aqueous sodium hydroxide solution was added. Using this reaction product (or resin) which was the self-condensate of resorcinol, a coating fluid (pH 12.0) was prepared by adjusting it so as to form a 1.0 wt. % aqueous sodium hydroxide solution having a resin concentration of 2.0% by weight.

PREPARATION EXAMPLE 6

A solution composed of 89.7% by weight of deionized water, 5.0% by weight of the self-condensate of resorcinol obtained in Preparation Example 5, 3.3% by weight of sodium hydroxide and 2.0% by weight of sodium hypochlorite was charged into a 1-liter autoclave, and reacted at room temperature with stirring. Thereafter, a coating fluid (pH 10.0) was prepared by diluting the reaction product 100-fold with deionized water.

PREPARATION EXAMPLE 7

A 2-liter autoclave was charged with 880 g of deionized water, 10 g of 4,4'-thiodiphenol and 10 g of sodium hydroxide. Then, 100 g of a 5.25 wt. % aqueous solution of sodium hypochlorite was slowly added dropwise thereto at room temperature with stirring to obtain the reaction product (pH 12.0).

Example 1

In a 15-liter stainless steel polymerizer fitted with agitating blades and a baffle plate, the coating fluid obtained in Preparation Example 1 was sprayed onto various parts (Temperature of inner wall of the Polymerizer: 30° C.) coming into contact with subsequently introduced vinyl chloride monomer (i.e., the inner wall of the polymerizer, the agitating blades, the baffle plate, various attached pipe joints and the like) by means of a sprayer so as to provide the coating agent in an amount of 0.5 g/m². Thereafter, the coated surfaces were rinsed with a spray of water.

The polymerizer having a coating layer formed in the above-described manner was charged with 4,800 g of deionized water, 1.42 g of di-2-ethylhexyl peroxydicarbonate, 0.45 g of cumyl peroxyneodecanoate, and 3.2 g of partially saponified polyvinyl alcohol having a degree of saponification of 80 mole %, and the interior of the polymerizer was evacuated to 40 mmHg by means of a vacuum pump. Thereafter, 3,200 g of vinyl chloride was introduced thereinto and reacted at 58° C. until the pressure reached 6.5 kg/cm²-G.

After completion of the reaction, unreacted monomer was recovered, the resulting slurry was discharged, and the inner wall of the polymerizer and the like were rinsed with water. Then, a second polymerization cycle was carried out in the same manner as described above, except that the application of the coating fluid was omitted. Thus, a total of seven polymerization cycles were consecutively carried out in the same manner. Thereafter, the weight of the polymer deposited on the inner wall of the polymerizer and the like was determined to be 0.3 g/m². The slurry of each batch was dehydrated and dried to obtain the polymer as a product, and various properties thereof were measured according to the testing methods which will be described later. The results thus obtained are shown in Table 1.

In this table, the polymerization time and the resin properties are average values for the seven batches. According to the method of the present invention, the amount of polymer deposited was significantly small and, moreover, the deposited polymer could be easily removed by simple washing with water. No prolongation of the polymerization time was observed and the resin properties of the resulting product were excellent.

Example 2

In a 15-liter stainless steel polymerizer fitted with agitating blades and a baffle plate, the coating fluid obtained in Preparation Example 2 was sprayed onto various parts coming into contact with subsequently introduced vinyl chloride monomer (i.e., the inner wall of the polymerizer, the agitating blades, the baffle plate, various attached pipe joints and the like) by means of a sprayer so as to provide the coating agent in an amount of 0.1 g/m². Thereafter, the methanol was evaporated under reduced pressure.

The polymerizer having a coating layer formed in the above-described manner was charged with 4,800 g of deionized water, 1.42 g of di-2-ethylhexyl peroxydicarbonate, 0.45 g of cumyl peroxyneodecanoate, and 3.2 g of partially saponified polyvinyl alcohol having a degree of saponification of 80 mole %, and the interior of the polymerizer was evacuated to 40 mmHg by means of a vacuum pump. Thereafter, 3,200 g of vinyl chloride was introduced thereinto and reacted at 58° C. until the pressure reached 6.5 kg/cm²-G.

After completion of the reaction, unreacted monomer was recovered, the resulting slurry was discharged, and the inner wall of the polymerizer and the like were rinsed with water. Then, a second polymerization cycle was carried out in the same manner as described above, except that the application of the coating fluid was omitted. Thus, a total of ten polymerization cycles were consecutively carried out in the same manner. Thereafter, the weight of the polymer deposited on the inner wall of the polymerizer and the like was determined to be 0.2 g/m². The slurry of each batch was dehydrated and dried to obtain the polymer as a product, and various properties thereof were measured according to the testing methods which will be described later. The results thus obtained are shown in Table 1. In this table, the polymerization time and the resin properties are average values for the ten batches. According to the method of the present invention, the amount of polymer deposited was significantly small and, moreover, the deposited polymer could be easily removed by simple washing with water. No prolongation of the polymerization time was observed and the resin properties of the resulting product were excellent.

Example 3

Polymerization was carried out under the same conditions as described in Example 1, including the coating method, the formulation of the polymerization mixture, and the number of polymerization cycles, except that the coating fluid obtained in Preparation Example 1 and used in Example 1 was replaced by the coating fluid obtained in Preparation Example 3 and adjusted to pH 10.4 with citric acid and the inner wall of the polymerizer was heated to a temperature of 60° C. during coating of coating fluid. The results thus obtained are shown in Table 1. The amount of polymer deposited was significantly small (i.e., 0.2 g/m²) and, moreover, the deposited polymer could be easily removed by simple washing with water. No prolongation of the polymerization time was observed and the resin properties of the resulting product were excellent.

Example 4

Polymerization was carried out under the same conditions as described in Example 2, including the coating method, the formulation of the polymerization mixture and the number of polymerization cycles, except that the coating fluid obtained in Preparation Example 2 and used in Example 2 was replaced by the coating fluid obtained in Preparation Example 4. The results thus obtained are shown in Table 1. The amount of polymer deposited was significantly small (i.e., 0.1 g/m²) and, moreover, the deposited polymer could be easily removed by simple washing with water. No prolongation of the polymerization time was observed and the resin properties of the resulting product were excellent.

Comparative Example 1

Polymerization was carried out only once under the same conditions as described in Example 1, except that the application of the coating fluid was omitted. The results thus obtained are shown in Table 1. The amount of polymer deposited was as large as 40.0 g/m².

Comparative Example 2

Polymerization was carried out under the same conditions as described in Example 1, including the coating method, the polymerization conditions and the number of polymerization cycles, except that the coating fluid used in Example 1 was replaced by the coating fluid containing the self-condensate of resorcinol as obtained in Preparation Example 5. The results thus obtained are shown in Table 1. It can be seen from the results of Table 1 that the amount of polymer deposited was large (i.e., 6.5 g/m²) and the number of fish eyes increased slightly.

Comparative Example 3

Polymerization was carried out under the same conditions as described in Example 1, including the coating method, the polymerization conditions and the number of polymerization cycles, except that the coating fluid used in Example 1 was replaced by the coating fluid containing the reaction product of the self-condensate of resorcinol with sodium hypochlorite as obtained in Preparation Example 6. The results thus obtained are shown in Table 1. It can be seen from the results of Table 1 that the amount of polymer deposited was large (i.e., 6.3 g/m²) and the number of fish eyes increased slightly.

Comparative Example 4

Polymerization was carried out under the same conditions as described in Example 1, including the coating method, the polymerization conditions and the number of polymerization cycles, except that the coating fluid used in Example 1 was replaced by a coating fluid containing the reaction product of 4,4'-thiodiphenol with sodium hypochlorite as obtained in Preparation Example 7 and adjusted to pH 10.5 by the addition of hydrochloric acid. The results thus obtained are shown in Table 1. It can be seen from the results of Table 1 that the amount of polymer deposited was large (i.e., 38.5 g/m²) and the number of fish eyes increased considerably.

Testing Methods

Average degree of polymerization: This was measured according to JIS K-6721.

Apparent specific gravity: This was measured according to JIS K-6721.

Number of fish eyes: A sample of PVC was blended with predetermined amounts of a plasticizer, a thermal stabilizer and the like. The resulting blend was kneaded at 150° C. for 5 minutes and formed into a sheet. Thereafter, the number of fish eyes present in an area of 10 cm ×10 cm was counted in the usual manner.

Porosity: This was measured according to the mercury penetration method.

TABLE 1

| Example No. | | 1 | 2 | 3 | 4 | Comparative Example 1 | Comparative Example 2 | Comparative Example 3 | Comparative Example 4 |
|---|---|---|---|---|---|---|---|---|---|
| Preparation Example No. of coating fluid | | 1 | 2 | 3 | 4 | — | 5 | 6 | 7 |
| Coating fluid | Phenolic monomer | Bisphenol A | Bisphenol A | Bisphenol F | Bisphenol F | — | Resorcinol | Resorcinol | 4,4'-thio-diphenol |
| | Solvent for coating fluid | 1.0% aqueous NaOH | Methanol | 1.0% aqueous NaOH | Methanol | — | 1.0% aqueous NaPH | 0.033% aqueous NaOH | 1.0% aqueous NaOH |
| | Concentration of reaction product (%) | 2.0 | 0.4 | 2.0 | 0.4 | — | 2.0 | 0.05 | 1.0 |
| Amount of coating (g/m$^2$) | | 0.5 | 0.1 | 0.5 | 0.1 | — | 0.5 | 0.5 | 0.5 |
| Number of times of polymerization | | 7 | 10 | 7 | 10 | 1 | 7 | 7 | 3 |
| Polymerization time (hr) | | 5.0 | 5.1 | 5.0 | 5.0 | 5.0 | 5.0 | 5.1 | 5.0 |
| Amount of polymer deposited (g/m$^2$) | | 0.3 | 0.2 | 0.2 | 0.1 | 40.0 | 6.5 | 6.3 | 38.5 |
| Resin properties | Average degree of polymerization | 1050 | 1050 | 1050 | 1040 | 1050 | 1050 | 1040 | 1050 |
| | Apparent specific gravity (g/m) Particle size distribution (%) | 0.487 | 0.485 | 0.486 | 0.483 | 0.484 | 0.486 | 0.484 | 0.483 |
| | Larger than 60 mesh | 0 | 0 | 0 | 0 | 0 | 0 | 0 | 0 |
| | 60–100 mesh | 37 | 36 | 38 | 37 | 38 | 37 | 39 | 40 |
| | 100–200 mesh | 60 | 60 | 59 | 59 | 59 | 60 | 57 | 56 |
| | Smaller than 200 mes | 3 | 4 | 3 | 4 | 3 | 3 | 4 | 4 |
| | Number of fish eyes | 15 | 13 | 17 | 14 | 15 | 32 | 30 | 64 |
| | Porosity (vol. %) | 18.3 | 18.4 | 18.2 | 18.3 | 18.3 | 18.2 | 18.4 | 18.1 |

What is claimed is:

1. A method for preventing scale formation on the inner walls of a polymerization apparatus during homopolymerization of vinyl chloride monomer or copolymerization of vinyl chloride monomer and a monomer copolymerizable therewith in the polymerization apparatus comprising: applying a coating fluid to said inner walls to form a coating layer thereon, the coating fluid containing the reaction product being prepared by the oxidative polymerization of a phenolic monomer of the following formula

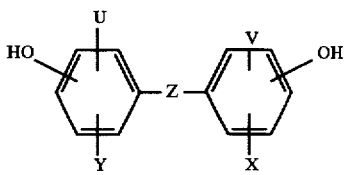

(1)

where U, V, X and and Y are each a hydrogen atom, an alkyl group, and alkoxy group, an aryl group or a phenylalkyl group, Z is —CO—, —(R$^1$)C(R$^2$)—, —O—, —OR$^3$—, —R$^4$O—, —R$^5$— or —C(R$^6$)—, and R$^1$ and R$^2$ are each a hydrogen atom or a linear or branched alkyl group of 1 to 5 carbon atoms, R$^3$ and R$^4$ are each a linear or branched alkylene group of 1 to 5 carbon atoms, R$^5$ is a linear or branched alkylene group of 1 to 8 carbon atoms, and R$^6$ is a saturated aliphatic ring group of 3 to 6 carbon atoms; and conducting homopolymerization of vinyl chloride monomer or copolymerization of vinyl chloride monomer and a monomer copolymerizable therewith.

2. The method as claimed in claim 1 wherein the oxidative polymerization is enzymatic oxidative polymerization.

3. The method as claimed in claim 1 wherein the coating fluid is an alkali metal hydroxide or alkaline earth metal hydroxide solution containing the reaction product.

4. The method as claimed in claim 3 wherein the concentration of the reaction product in the alkali method hydroxide or alkaline earth metal hydroxide solution is in the range of 0.1 to 10.0% by weight of the solution and the concentration of the alkali metal hydroxide or alkaline earth metal hydroxide is in the range of 0.05 to 5.0% by the weight of the solution.

5. The method as claimed in claim 1 wherein the coating fluid is an organic solvent solution containing the reaction product.

6. The method as claimed in claim 5 wherein the concentration of the reaction product in the organic solvent solution is in the range of 0.03 to 3.0% by weight of the solution.

* * * * *